Patented June 7, 1949

2,472,066

UNITED STATES PATENT OFFICE 2,472,066

2-ARYLAMINO-4-HALOGENOQUINOLINES

Francis Henry Swinden Curd, Clifford Gordon Raison, and Francis Leslie Rose, Blackley, Manchester, England, assignors to Imperial Chemical Industries Limited, a corporation of Great Britain No Drawing. Application July 31, 1945, Serial No. 608,087. In Great Britain August 31, 1944

1 Claim. (Cl. 260—288)

This invention relates to the manufacture of new heterocyclic compounds. More particularly it relates to the manufacture of new quinoline derivatives which are useful as intermediates in the manufacture of chemotherapeutic agents and especially of the compounds of copending application of Curd, Landquist, Raison and Rose, Serial No. 608,088, of even filing date herewith.

According to the invention we make new 4-halogenoquinolines which bear in the 2-position an arylamino group which may be unsubstituted or may bear one or more non-acidic substituents such, for example, as halogen atoms, nitro groups, hydrocarbon radicals (which themselves may bear simple substituents and which may be attached to the arylamino group directly or through an oxygen, nitrogen or sulphur atom or through a sulphonyl or carbonyl group), cyano groups or esterified carboxyl groups, and which optionally bear in the other nuclear positions one or more non-acidic substituents, for example, alkyl, alkoxy, halogeno or nitro groups, or fused-on carbocyclic rings (as, for example, in 7:8-benzoquinoline), by a process comprising the interaction of an appropriate arylamine with a 2:4-dihalogeno-quinoline. The dihalogenoquinoline is preferably used in substantially the stoichiometric proportion; an excess may be used if desired, but with no advantage. A large excess of the arylamine should be avoided as it may lead to the formation of the di-arylamino compound.

The reaction is conveniently brought about by heating the reagents together, optionally in presence of a solvent or diluent. If desired, a catalyst, such as a small proportion of the arylamine hydrochloride, may be used.

As already indicated, the arylamines to be used in this process may be substituted or unsubstituted, but they must be devoid of acidic substituents such as carboxylic or sulphonic acid groups or phenolic groups. As examples of suitable amines there may be mentioned aniline, o, m- and p-chloroanilines, o- and p-methoxyanilines, o-, m- and p-toluidines, o, and p-bromoanilines, p-methylmercaptoaniline, 2:4-, 3:4- and 2:5-dichloroanilines, 3:4-dimethylaniline, 2-methyl-4-chloroaniline, 3-chloro-4-methylaniline, p-dimethylaminoaniline, p-nitroaniline, p-cyanoaniline, p-carbomethoxyaniline, p-ethoxyaniline, p-n-butylaniline, p-phenylaniline, α- and β-naphthylamines, 4-chloro-α-naphthylamine, 6-bromo-β-naphthylamine and 6-methoxy-β-naphthylamine.

The following examples, in which the parts are by weight, illustrate but do not limit the invention.

Example 1

A mixture of 19.8 parts of 2:4-dichloroquinoline, 12.75 parts of p-chloroaniline and 40 parts of acetic acid is heated and stirred at 95°–100° C. for 2 hours. The mixture is cooled and diluted with a large volume of water. A precipitate is formed. This is filtered off and boiled with methanol. Ammonia is then added until the mixture is alkaline. A large volume of water is added and the mixture is cooled whereupon a precipitate is formed. This is filtered off and dried. It is 2-p-choloranilino-4-chloroquinoline. By crystallisation from methanol it is obtained as pale yellow needles, M. P. 134°–136° C.

Example 2

A mixture of 19.8 parts of 2:4-dichloroquinoline, 12.75 parts of p-chloroaniline and 40 parts of chlorobenzene is stirred and heated at 100–110° C. for 2 hours. The reaction mixture is cooled and 60 parts of benzene are added. The solid which separates is filtered off and dried. It is then boiled with 100 parts of methanol. The mixture is basified by addition of ammonia, and then diluted with a large volume of water. On cooling, a solid separates out. It is filtered off and dried and crystallised from methanol. There is thus obtained 2-p-chloroanilino-4-chloroquinoline in the form of pale yellow needles, M. P. 135°–136° C.

Example 3

A mixture of 14.85 parts of 2:4-dichloroquinoline, 7 parts of aniline and 30 parts of acetic acid is heated and stirred at 95°–100° C. for 1 hour. The reaction is now complete and the product is present as its hydrochloride. 15 parts of fused sodium acetate are added and after heating for a further ½ hour, the mixture is cooled and diluted with a large volume of water. A precipitate is formed. This is washed with water by decantation and 35 parts of methanol are added. The undissolved material is filtered off, washed with methanol, dried and then crystallised from ethanol. There is thus obtained 2-anilino-4-chloroquinoline in the form of pale yellow prisms, M. P. 162°–163° C.

Example 4

A mixture of 39.6 parts of 2:4-dichloroquinoline, 24.6 parts of p-anisidine and 80 parts of acetic acid is heated and stirred at 95°–100° C. for 2 hours. The reaction mixture is then cooled and diluted with a large volume of water. The precipitate which is formed is washed with water by decantation and then boiled with 150 parts of methanol. Ammonia is then added until the mixture is alkaline. A large volume of water is added and the mixture is cooled. A solid separates out and is filtered off and dried. This is crude 2-p-anisidino-4-chloroquinoline which by crystallisation from methanol is obtained as pale yellow fine needles, M. P. 140° C.

*Example 5*

A mixture of 39.6 parts of 2:4-dichloro-quinoline, 21.4 parts of p-toluidine and 80 parts of acetic acid is heated and stirred at 95°–100° C. for 2 hours. The reaction mixture is cooled and diluted with a large volume of water. A precipitate is formed which is washed with water by decantation and then boiled with 150 parts of methanol. Ammonia is added until the mixture is alkaline and then a large volume of water is added and the mixture is cooled. The solid which separates out is filtered off, dried and crystallised from methanol. There is thus obtained 2-p-toluidino-4-chloroquinoline in the form of pale yellow prisms, M. P. 115.5°–116.5° C.

*Example 6*

A mixture of 39.6 parts of 2:4-dichloroquinoline, 28.6 parts of β-naphthylamine and 80 parts of acetic acid is heated and stirred at 95°–100° C. for 2 hours. The reaction mixture is cooled and diluted with a large volume of water. A precipitate is formed which is washed with water by decantation and then boiled with 150 parts of methanol. Ammonia is added until the mixture is alkaline and then a large volume of water is added and the mixture is cooled. A precipitate is formed. The aqueous liquid is decanted off and the sticky precipitate is digested with aqueous methanol (90 parts methanol:10 parts water) until it is solid. It is then filtered off, washed with aqueous methanol and dried. By crystallisation from aqueous methanol, 2-β-naphthylamino-4-chloroquinoline is obtained, M. P. 108°–110° C.

*Example 7*

A mixture of 24.8 parts of 2:4-dichloro-7:8-benzquinoline (M. P. 134°–135° C., made by heating phosphorus oxychloride with 2:4-dihydroxy-7:8-benzquinoline, itself obtained from the reaction of α-naphthylamine with diethyl malonate), 12.7 parts of p-chloroaniline, 0.1 part of p-chloroaniline hydrochloride and 30 parts of β-ethoxyethanol is heated and stirred at 160° C. for 3½ hours. The initially clear solution soon begins to deposit greenish-yellow crystals. The mixture is cooled and a large volume of water is added. The solid material is filtered off and dried. It is then boiled with 350 parts of ethanol. Ammonia is added until the mixture is alkaline and the clear solution is cooled and diluted with an equal amount of water. The sticky precipitate so produced solidifies on standing and is then filtered off and dried. By crystallisation from benzene and then from butanol, 2-p-chloroanilino-4-chloro-7:8-benzquinoline is obtained as masses of buff-coloured needles, M. P. 160°–162° C.

*Example 8*

A mixture of 33 parts of 2:4-dichloroquinoline, 37 parts of 6-bromo-β-naphthylamine and 75 parts of acetic acid is heated and stirred at 95°–100° C. for 1 hour. The reaction mixture is cooled and filtered and the greenish-yellow crystals so obtained are well washed with acetic acid. They are then boiled with 150 parts of methanol and ammonia is added until the mixture is alkaline. After cooling, the mixture is filtered. The residue is washed with methanol and then with water, dried and crystallised first from aqueous butanol and then from n-propanol. There is thus obtained 2-(6'-bromo-β-naphthylamino)-4-chloroquinoline, M. P. 152°–154° C.

*Example 9*

A mixture of 19.8 parts of 2:4-dichloroquinoline, 13.8 parts of p-nitroaniline and 40 parts of acetic acid is heated and stirred at 95°–100° C. for 2 hours. The reaction mixture is cooled, diluted with water until no more precipitate is formed and filtered. The residue is boiled with 200 parts of methanol and ammonia is added until the mixture is alkaline. A large volume of water is then added and the mixture is cooled. The base which is precipitated is filtered off and dried. It is then crystallised, first from β-ethoxyethanol and then from dioxane. There is thus obtained 2-p-nitroanilino-4-chloroquinoline in the form of golden-yellow prisms of M. P. 263°–265° C.

*Example 10*

A mixture of 21.2 parts of 2:4-dichloro-3-methylquinoline (M. P. 90°–91° C.; made by the action of phosphorus oxychloride on 2:4-dihydroxy-3-methylquinoline, itself made by heating aniline with diethyl methylmalonate), 12.75 parts of p-chloroaniline and 40 parts of acetic acid is heated and stirred at 95°–100° C. for 2 hours. The reaction mixture is cooled, diluted with water until no more precipitate is formed and filtered. The residue is boiled with 100 parts of methanol and ammonia is added until the mixture is alkaline. A large volume of water is then added and the mixture is cooled. The base which is precipitated is filtered off and dried. It is boiled with 150 parts of ethanol and the hot solution is filtered and cooled. When cold, the crystals which have separated out are filtered off and then stirred with 50 parts of cold dioxane for 1½ hours. At the end of this time, the undissolved crystals (which consist of 2:4-di-(p-chloroanilino)-3-methylquinoline) are filtered off and discarded and the dioxane solution is diluted with water whereupon crystals of 2-p-chloroanilino-3-methyl-4-chloroquinoline separate out. After recrystallisation from ethanol, it has M. P. 120–121° C.

*Example 11*

A mixture of 28.5 parts of 2:4-dichloro-3-ethylquinoline (B. P. 182°–184° C./21 mm.; made by the action of phosphorus oxychloride on 2:4-dihydroxy-3-ethylquinoline, itself made by heating aniline with diethyl ethylmalonate), 16.1 parts of p-chloroaniline and 63 parts of acetic acid is heated and stirred at 95°–100° C. for 2 hours. The reaction mixture is cooled, diluted with water until no more precipitate is formed and filtered. The residue is boiled with 150 parts of methanol and ammonia is added until the mixture is alkaline. A large volume of water is added and the mixture is cooled. The base which is precipitated is filtered off and dried. It is boiled with 120 parts of ethanol and the hot solution is filtered and cooled. When cold, the crystals which have separated out are filtered off and then stirred with 50 parts of cold dioxane for 2 hours. At the end of this time, the undissolved crystals (which consist of 2:4-di-(p-chloroanilino)-3-ethylquinoline) are filtered off and discarded and the dioxane solution is diluted with water whereupon crystals of 2-p-chloroanilino-3-ethyl-4-chloro-quinoline separate out. After recrystallisation from ethanol, it has M. P. 132°–133° C.

Whereas the above description and examples illustrate many widely varied embodiments of the invention, it will be apparent to one skilled in the art that many other embodiments and variations may be devised without departing from the spirit and scope thereof and accordingly it is to be understood that the invention is not in any way limited except as defined in the following claim.

We claim:
2-p-chloroanilino-4-chloro-quinoline.

FRANCIS HENRY SWINDEN CURD.
CLIFFORD GORDON RAISON.
FRANCIS LESLIE ROSE.

REFERENCES CITED

The following references are of record in the file of this patent:

Ephriam, Berichte, 26, 2227–2230 (1893).
Niementowski, Berichte, 40, 4285–4294 (1907).